(12) United States Patent
Moritz et al.

(10) Patent No.: US 6,853,875 B1
(45) Date of Patent: Feb. 8, 2005

(54) SYSTEM FOR THE COMBINED HANDLING, DELIVERY AND/OR PROTECTION OF MULTIPLE STANDARDIZED CONTAINERS AND THEIR CONTROLLABLE PAYLOADS

(75) Inventors: Elan Moritz, Lynn Haven, FL (US); Helmut Portmann, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 372 days.

(21) Appl. No.: 10/101,095

(22) Filed: Mar. 20, 2002

(51) Int. Cl.[7] ............................................... G06F 7/00
(52) U.S. Cl. ........................................ 700/229; 700/213
(58) Field of Search .............................. 700/213, 225, 700/229

(56) References Cited

U.S. PATENT DOCUMENTS 6,056,237 A * 5/2000 Woodland ................... 244/120
6,339,372 B1 * 1/2002 Warnock et al. ............ 340/531
6,354,181 B1 * 3/2002 Donovan ........................ 86/50
6,380,889 B1 * 4/2002 Herrmann et al. ..... 342/357.09
6,546,312 B1 * 4/2003 Matsumoto ................. 700/213

* cited by examiner

Primary Examiner—Gene O. Crawford
(74) Attorney, Agent, or Firm—James T. Shepherd; Donald G. Peck

(57) ABSTRACT

An unmanned system is provided for the handling and delivery of a plurality of operational payloads. Each of a plurality of standardized shipping containers houses an operational payload, a controller that controls functions of the operational payload, and communication means that communicates with the controller. A structure is provided for supporting the shipping containers in a fixed relationship to one another so that the shipping containers can be handled and transported collectively by moving the structure. The structure is equipped with means to facilitate data transfer with each shipping container's controller.

42 Claims, 5 Drawing Sheets

US 6,853,875 B1

SYSTEM FOR THE COMBINED HANDLING, DELIVERY AND/OR PROTECTION OF MULTIPLE STANDARDIZED CONTAINERS AND THEIR CONTROLLABLE PAYLOADS

ORIGIN OF THE INVENTION

The invention described herein was made in the performance of official duties by a employees of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "STANDARDIZED CONTAINER PAYLOAD DELIVERY AND CONTROL SYSTEM" (Navy Case No. 83610) by the same inventors as this patent application.

FIELD OF THE INVENTION

The invention relates generally to payload delivery systems, and more particularly to an unmanned system that can be used to house, deliver and/or protect multiple standardized containers and their controllable and unmanned payloads.

BACKGROUND OF THE INVENTION

Currently, operational payloads such as sensors, ordnance, unmanned aerial vehicles or UAVs, unmanned undersea vehicles or UUVs, unmanned surface vehicles or USVs, and unmanned ground vehicles or UGVs, as well as sophisticated weapons such as smart bombs and small tactical missiles, are delivered and dispensed largely by highly specialized and expensive delivery platforms. For the military, this includes state-of-the-art bombers, fighter aircraft, warships, specialized transport ships, submarines and specialized ground vehicles. Most, if not all of these operational payloads, were developed and fielded to counter high-capability foes that also possess high-technology weaponry. However, delivery and dispensing of the payloads by largely manual methods (i.e., humans manipulate and operate the delivery platforms and payloads) and expensive apparatus (i.e., the specialized delivery platforms) is not cost-effective and efficient for all military applications. In cases where these methods and apparatus are applied against relatively low-technology and low-capability foes, any long drawn-out conflicts will ultimately impose significant financial and resource burdens on the military. Additionally, the wear and tear on the delivery platforms from repeated and extensive sorties reduces the useful life of the delivery platforms and increases their attrition.

SUMMARY OF THE INVENTION

Accordingly, it is an object of the present invention to provide a system for the delivery and control of multiple operational payloads.

Another object of the present invention is to provide an unmanned system that can be used to deliver and control a variety of operational payloads.

Still another object of the present invention is to provide a standardized system that can house and control each of a plurality of operational payloads while providing for their transport to a destination by a wide variety of existing delivery platforms.

Other objects and advantages of the present invention will become more obvious hereinafter in the specification and drawings.

In accordance with the present invention, an unmanned system for the handling and delivery of a plurality of operational payloads. Each of a plurality of standardized shipping containers houses an operational payload. Each shipping container houses i) a controller that couples to and controls functions of the operational payload associated therewith, and ii) communication means that couples to and communicates with the controller. A structure is provided for supporting the shipping containers in a fixed relationship to one another so that the shipping containers can be handled and transported collectively by moving the structure. The structure further supports means coupled to each shipping container's communication means that will facilitate data transfer with each shipping container's controller.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
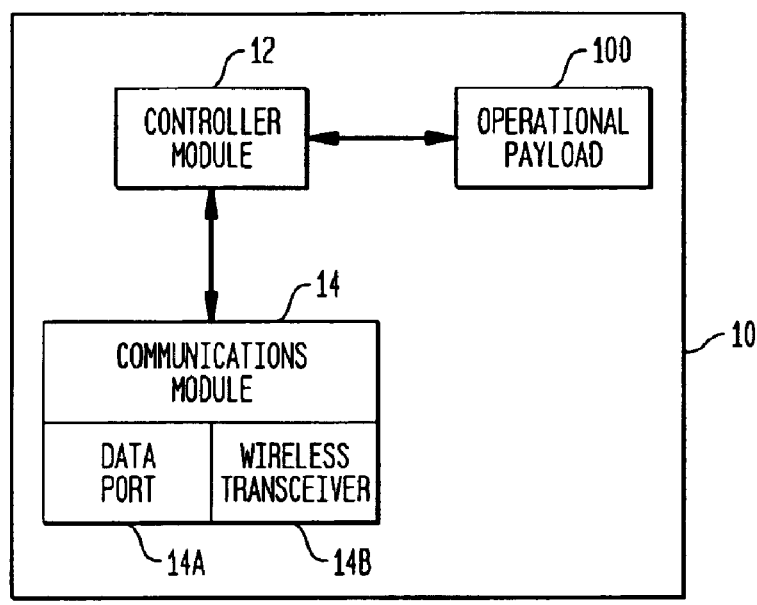
FIG. 1 is a schematic view of an unmanned system used for the delivery and control of an operational payload in accordance with the present invention.

Referring now to the drawings, and more particularly to FIG. 1, a schematic view of an unmanned system for the delivery and control of an operational payload 100 in accordance with the present invention is illustrated. This system includes a shipping container 10 with a controller module 12 and a communications module 14 mounted within shipping container 10. Operational payload 100 is representative of any type of system that performs an operation within and/or outside of shipping container 10 if it is to be dispensed therefrom. Such operational payloads include, but are not limited to, military and non-military payloads, sensor systems (e.g., passive sensors, active sensors, etc.), ordnance (e.g., "smart" or "dumb" weapons with or without propulsion and control), materials and supplies, unmanned vehicles (e.g., aerial, ground, surface or undersea vehicles), satellite platforms, living organisms, chemicals and liquids, and material dispensing systems.

Accordingly, it is to be understood that operational payload 100 is not part of the present invention or a limitation thereof.

Figure 2:
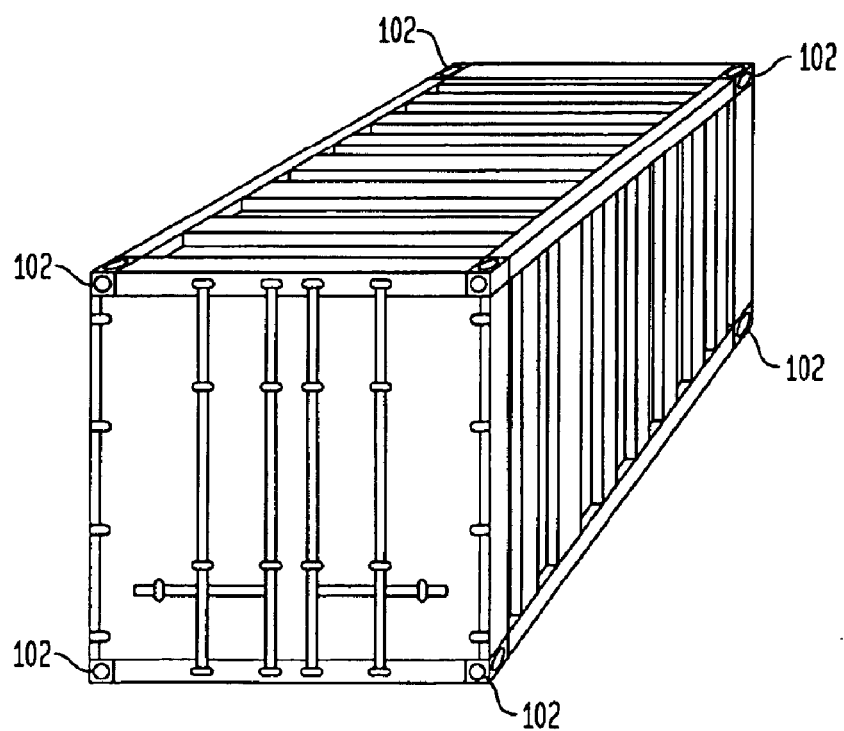
FIG. 2 is a perspective view of an ISO shipping container.

Shipping container 10 is any existing or specially-designed standardized shipping container having standardized outer dimensions and features to allow the use of existing handling and storage facilities that are used by a wide variety of military and commercial applications. For example, shipping container 10 could be a container constructed in accordance with standards set forth by the International Organization for Standardization or ISO as it is known. A standard ISO shipping container is illustrated in FIG. 2 where, as is known in the art, corner fittings 102 provide the means for handling the container. Corner fittings 102 could also provide for the coupling of adjacent shipping containers. Further, the standard outer dimensions of the ISO shipping container are already relied upon by both military and commercial organizations.

Controller module 12 is representative of application-specific hardware and software that cooperates to control the functions of operational payload 100. Such command and control of operational payload 100 can be pre-programmed into controller module 12 or can be provided in real time as will be explained further below. If pre-programmed, controller module 12 could be configured to trigger an operational sequence, for example, at a predetermined time, at a predetermined location, in response to a sensed condition, etc.

Communication with controller module 12 and operational payload 100 is made possible by communications module 14. Such communication could be limited to monitoring the functions of controller module 12 and/or the status of operational payload 100. Transfer of information from communications module 14 could occur through direct coupling thereto (e.g., via a data port 14A accessible on the exterior of shipping container 10) by a hand-held or other portable computer. Additionally or alternatively, communications module 14 could include equipment capable of transmitting monitored data to a remote location. In such cases, communications module 14 could include a wireless transceiver 14B for transmitting (e.g., via an antenna) the monitored data in a wireless fashion for receipt at a remote location. Further, wireless transceiver 14B could be used to transfer control of operational payload 100 to an external controller (not shown) should controller module 12 fail or for other reasons.

Wireless transceiver 14B could also serve as a receiver of instructions used to program controller module 12 in order to ultimately control the functions of operational payload 100. In this way, the present invention provides for the remote control of operational payload 100 in real time. Thus, shipping container 10 could be delivered to a destination with on-site operation of the payload being brought about in an "unmanned" fashion from a remote location.

Figure 3:
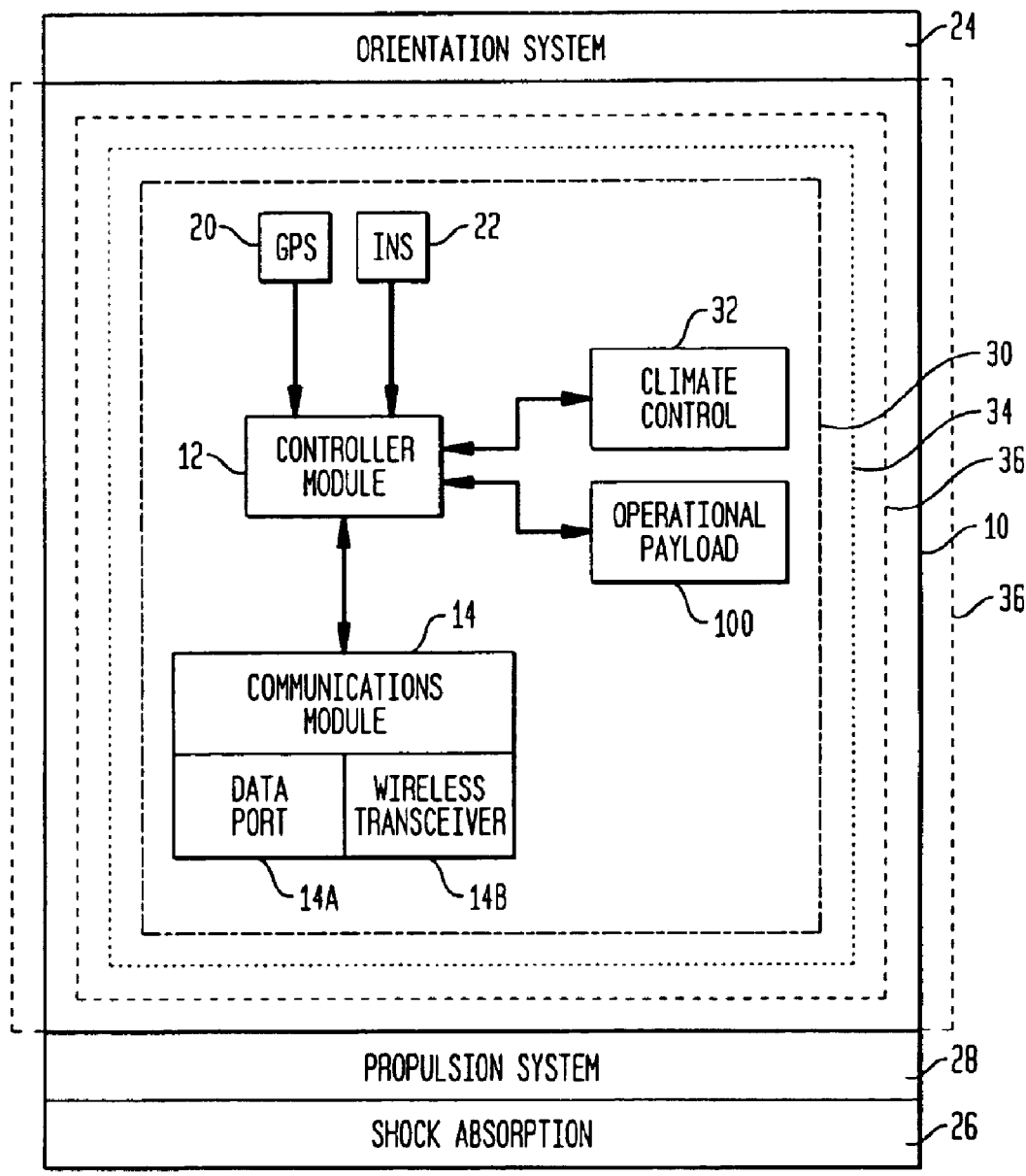
FIG. 3 is a schematic view of the unmanned system of the present invention further equipped with a variety of positioning and protection features.

While FIG. 1 and the above description illustrate the basic elements of the present invention, additional features can be incorporated. Some of these features will now be described with the aid of FIG. 3 where all or any single one or combination of the illustrated and described features could be incorporated with the basic system illustrated in FIG. 1 depending on application requirements. Should a global position of shipping container 10 be required, such position information can be provided by either or both of a Global Positioning System (GPS) module 20 and an inertial navigation system (INS) module 22 which supply the determined position information to controller module 12.

In applications requiring the release of shipping container 10 in a fluid environment such as the air or water, it may be necessary to couple an orientation system 24 to shipping container 10. Orientation system 24 represents any apparatus or system designed to place shipping container 10 in a preferred orientation once it is released into a fluid environment. Accordingly, orientation system 24 could include, but is not limited to, parachutes, control surfaces and ballast devices. A shock absorption system 26 may also be required to absorb impact shocks when shipping container 10 hits the ground. Such shock absorption could include parachutes, springs, air cushions, etc.

Some applications may require shipping container 10 to travel short distances or be maneuvered at its delivery destination. For these applications, a propulsion system 28 can be provided and coupled to shipping container 10. Control for propulsion system 28 would be governed by controller module 12.

Should any or all of controller module 12, communications module 14 and operational payload 100 be moisture sensitive, it may be necessary to waterproof the contents of shipping container 10. Such waterproofing is indicated by dot-dash line 30. Additionally, a climate control module 32 (e.g., air conditioning, heating, humidity, air pressure, etc.) can be provided in shipping container 10 and placed under the control of controller module 12. It may also be necessary to protect the contents of shipping container 10 from electromagnetic interference (EMI). Accordingly, EMI shielding can be provided as indicated by dotted line 34. Still further, it may be necessary to protect the contents of shipping container 10 from various shock and/or vibration forces. For example, if protection from incoming projectiles is a concern, armor can be provided about some or all of the interior and/or exterior of shipping container 10 as indicated by dashed lines 36.

Figure 4:
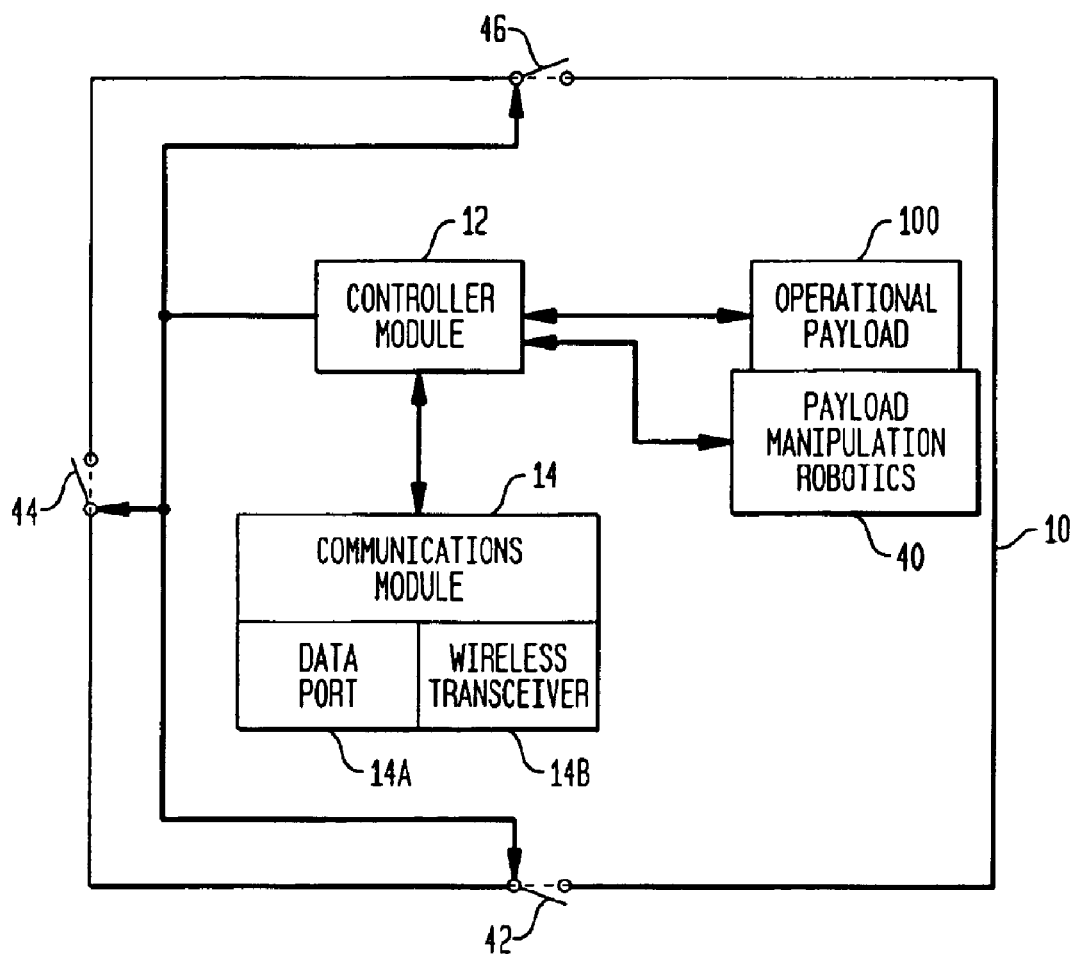
FIG. 4 is a schematic view of the unmanned system of the present invention further equipped to manipulate and dispense the operational payload.

As mentioned above, the present invention can be used to dispense a wide variety of payloads or systems. Accordingly, FIG. 4 illustrates the additional features that must be incorporated with the basic FIG. 1 design in order to accomplish the dispensing tasks. Payload manipulation robotics 40, under the control of controller module 12, are provided in shipping container 10. Manipulation robotics 40 can be used to store and establish a predetermined dispensing sequence, and further used to dispense the payload at the appropriate time. Loading and dispensing of the payload can occur through one or more doors that form part of the outer structure of shipping container 10. The doors can be located at one or more of the bottom, sides and top of shipping container 10 as indicated by doors 42, 44 and 46, respectively. Each of doors 42, 44 and 46 is a mechanized door assembly that is opened/closed under the control of controller module 12.

Figure 5:
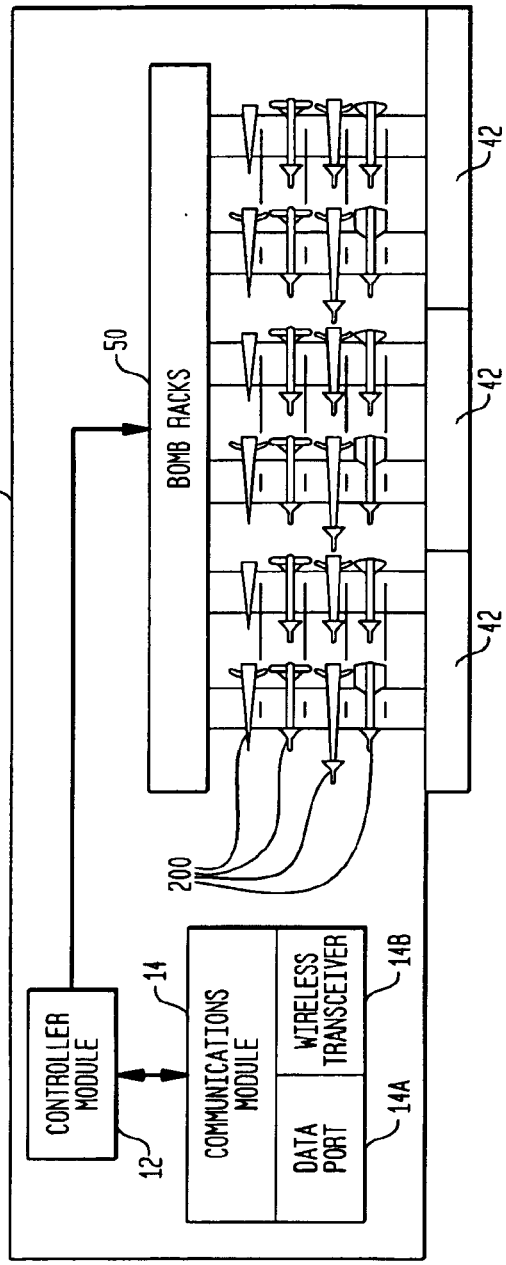
FIG. 5 is a schematic view of an unmanned system that provides for the delivery and controlled dispensing of ordnance.
Figure 6:
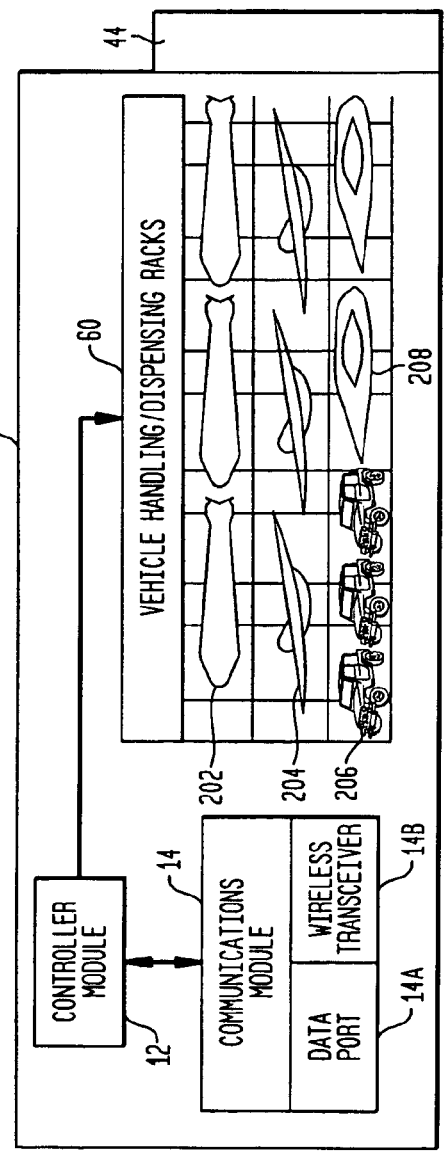
FIG. 6 is a schematic view of an unmanned system that provides for the delivery and controlled dispensing of unmanned vehicles.

Some specific examples of the present invention in terms of payload dispensing are illustrated in FIGS. 5 and 6. In FIG. 5, shipping container 10 houses automated/robotic bomb racks 50 which store and stage a variety of ordnance 200. As dictated by instructions carried out by controller module 12, bottom doors 42 are opened (as shown) and racks 50 are controlled to release some or all of ordnance 200. In FIG. 6, shipping container 10 houses automated/robotic vehicle handling/dispensing racks 60 which store and stage a variety of unmanned vehicles such as undersea vehicles 202, air vehicles 204 and surface vehicles 206 and 208. As dictated by instructions carried out by controller module 12, side doors 44 are opened (as shown) and racks 60 are controlled to release some or all of the stored vehicles.

Figure 7:
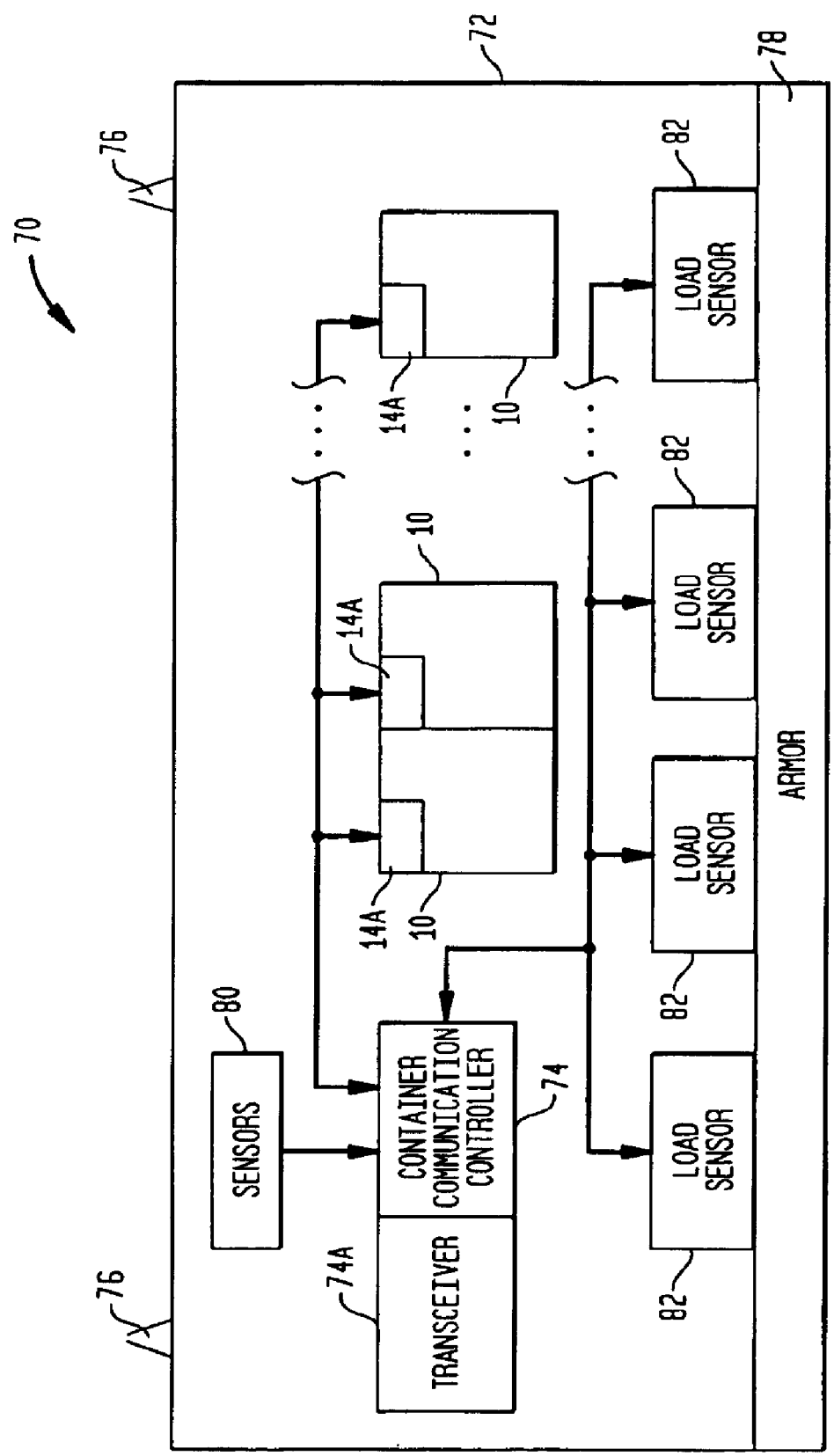
FIG. 7 is a schematic view of an unmanned system that facilitates the handling, delivery and protection of a plurality of shipping containers equipped in accordance with the present invention.

The invention as described thus far contemplates a single container and its contents. However, the present invention can be extended to a system that delivers a plurality of such standardized "smart" containers where each container houses its own separately controllable operational payload. The payloads can be the same or different from container to container. In order to facilitate handling, delivery and protection of a plurality of the present invention's "smart" containers 10, a system 70 is provided and illustrated in FIG. 7. Each of shipping containers 10 is equipped in one of the ways described above where all shipping containers 10 could be equipped identically or each one could be uniquely equipped.

System 70 includes an outer structure 72 that mechanically receives each of shipping containers 10 in some positive fashion such as a slide-in bay, drop-in base, or in other ways known in the art. The choice of mechanical coupling of each shipping container 10 to structure 72 is not a limitation of the present invention. In addition, each shipping container 10 is coupled electronically to a container communications controller module 74. For example, each container's data port 14A could be "plugged" into controller module 74. Controller module 74 can then monitor the status of each shipping container 10, provide data (e.g., sensor data, position data, etc.) to each shipping container 10, and provide any other control function as required by a specific application. Controller module 74 can be pre-programmed or controlled in real time from a remote location via, for example, a transceiver portion 74A of controller module 74 that could operate in the same fashion as communications module 14 in each of shipping containers 10.

Structure 72 typically includes lifting points 76 that are used when a crane lifts structure 72 onto a transport vehicle/ship or when structure 72 is lifted by means of an aircraft. Construction of structure 72 can vary with the particular application. For example, structure 72 could be implemented by a frame type of assembly (i.e., minimal or no solid walls) that provided for the loading of structure 72 from the sides and/or top thereof, while also allowing an individual container's side, bottom or top doors (not shown in FIG. 7) to be opened as needed for dispensing of their payloads. Alternatively, structure 72 can be a closed, solid-wall structure having its own side, bottom and/or top doors individually controlled by controller module 74. In this case, appropriate ones of shipping containers 10 could be notified by controller module 74 when the doors of structure 72 were opened.

System 70 can also be equipped with armor 78 along its bottom (as shown) or at other appropriate portions thereof. System 70 can also be equipped with sensors 80 that provide controller module 74 and, ultimately each of shipping containers 10, with critical sensed data. In this way, one set of sensors could serve a plurality of the shipping containers that are designed to remain together for a given mission.

The loading of loaded shipping containers 10 on or into structure 72 will typically occur on a one-by-one basis. Since the weight of each loaded shipping container 10 can be substantial, the overall load balance of system 70 at any given time could be of concern. Accordingly, a plurality of load sensors 82 can be distributed about and coupled to structure 72 for sensing the load thereat at any given time. The output of load sensors 82 can be supplied to controller module 74 which can either process the sensed load data locally or pass it on to a remote location/processor via transceiver portion 74A. The sensed load data can be used, for example, to indicate critical load imbalances, to indicate the location in structure 72 that the next loaded shipping container should occupy to balance the overall load of system 70, to indicate the overall load of system 70 which is important to the vehicle transporting same, and to indicate changing status of the overall load of system 70 as shipping container payloads are dispensed.

The advantages of the present invention are numerous. The standardized "smart" shipping container equipped as described herein provides a new type of unmanned system that can be used to deliver and control an operational payload. By being standardized, the present invention offers the possibility of significant cost reduction in the area of delivering and dispensing a wide variety of payloads as existing handling and transportation of standard shipping containers is well utilized by both the military and commercial entities. The unmanned nature of the present invention will reduce the risk to personnel in military conflicts and/or hostile environments. At the same time, the present invention provides for real time control of an operational payload from a safe remote location. In terms of dispensing payloads in military conflicts, the present invention offers the opportunity to reduce the use of highly sophisticated aircraft and undersea vehicles as the means for delivering and dispensing ordnance, sensors and supplies. Instead, shipping containers can be delivered to their destination by means of less sophisticated "work horse" delivery platforms.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An unmanned system for the handling and delivery of a plurality of operational payloads, comprising:

a plurality of standardized shipping containers, each of said plurality of standardized shipping containers housing an operational payload;

each of said plurality of standardized shipping containers housing i) a controller that couples to and controls functions of the operational payload associated therewith, and ii) communication means that couples to and communicates with said controller;

a structure for supporting said plurality of standardized shipping containers in a fixed relationship to one another wherein said plurality of standardized shipping containers can be handled and transported collectively by moving said structure; and means, supported by said structure and coupled to each said communication means, for facilitating data transfer with each said controller.

2. An unmanned system as in claim 1 further comprising sensor means supported by said structure and coupled to said means for facilitating data transfer with each said controller.

3. An unmanned system as in claim 1 further comprising armor coupled to at least a portion of said structure for protecting said structure from strikes by projectiles.

4. An unmanned system as in claim 1 wherein each of said plurality of standardized shipping containers is an ISO shipping container.

5. An unmanned system as in claim 1 further comprising means, mounted in at least one of said plurality of standardized shipping containers and coupled to said controller and the operational payload associated therewith, for automated manipulation of the operational payload as dictated by instructions provided by said controller.

6. An unmanned system as in claim 1 further comprising means, coupled to said controller and shipping container structure of at least one of said plurality of standardized shipping containers, for automatically opening said shipping container structure as dictated by instructions provided by said controller to permit dispensing of at least a portion of the operational payload associated therewith.

7. An unmanned system as in claim 6 wherein said means is coupled to a side of said shipping container structure and wherein said side can be opened and closed.

8. An unmanned system as in claim 6 wherein said means is coupled to a bottom portion of said shipping container structure and wherein said bottom portion can be opened and closed.

9. An unmanned system as in claim 6 wherein said means is coupled to a top portion of said shipping container structure and wherein said top portion can be opened and closed.

10. An unmanned system as in claim 1 further comprising armor coupled to at least a portion of at least one of said plurality of standardized shipping containers for protection thereof from strikes by projectiles.

11. An unmanned system as in claim 1 wherein said controller for at least one of said plurality of standardized shipping containers is pre-programmed to autonomously control said functions of the operational payload associated therewith.

12. An unmanned system as in claim 1 wherein said controller for at least one of said plurality of standardized shipping containers is programmable in real time by remotely-sent instructions received by said communication means associated therewith.

13. An unmanned system as in claim 1 wherein each said communication means is a wireless transceiver for communicating with a remote location.

14. An unmanned system as in claim 1 further comprising means, mounted in each of said plurality of standardized shipping containers and coupled to said controller associated therewith, for autonomously establishing a global position thereof.

15. An unmanned system as in claim 14 wherein said means for autonomously establishing a global position is selected from the group consisting of a GPS system and an inertial navigation system.

16. An unmanned system as in claim 1 further comprising propulsion means coupled to at least one of said plurality of standardized shipping containers and said controller associated therewith, wherein said at least one can be maneuvered under control of said controller associated therewith.

17. An unmanned system as in claim 1 further comprising means coupled to at least one of said plurality of standardized shipping containers for placing said at least one in preferred orientation when released into a fluid environment.

18. An unmanned system as in claim 1 further comprising means mounted on the outside of each of said plurality of standardized shipping containers for facilitating handling thereof.

19. An unmanned system as in claim 1 further comprising means mounted on the outside of each of said plurality of standardized shipping containers for facilitating connection with an adjacent shipping container.

20. An unmanned system as in claim 1 wherein at least one of said plurality of standardized shipping containers is waterproof.

21. An unmanned system as in claim 1 wherein at least one of said plurality of standardized shipping containers incorporated EMI shielding.

22. An unmanned system as in claim 1 further comprising means coupled to at least one of said plurality of standardized shipping containers for mitigating shock forces experienced thereby.

23. An unmanned system as in claim 1 further comprising means coupled to at least one of said plurality of standardized shipping containers for controlling climatic conditions therein.

24. An unmanned system for the handling and delivery of a plurality of operational payloads, comprising:
  a plurality of standardized shipping containers, each of said plurality of standardized shipping containers housing an operational payload, each of said plurality of standardized shipping containers having exterior features for facilitating handling thereof;
  each of said plurality of standardized shipping containers housing i) a controller that couples to and controls functions of the operational payload associated therewith and monitors status thereof, and ii) a wireless communications transceiver that couples to and communicates with said controller associated therewith for transmitting said status to a remote location and for receiving instructions from said remote location wherein said instructions are used by said controller in controlling said functions of the operational payload associated therewith;
  a structure for supporting said plurality of standardized shipping containers in a fixed relationship to one another wherein said plurality of standardized shipping containers can be handled and transported collectively by moving said structure; and
  means, housed within said structure, for facilitating data transfer with each said controller via said wireless communications transceiver.

25. An unmanned system as in claim 24 further comprising sensor means supported by said structure and coupled to said means for facilitating data transfer with each said controller.

26. An unmanned system as in claim 24 further comprising armor coupled to at least a portion of said structure for protecting said structure from strikes by projectiles.

27. An unmanned system as in claim 24 wherein each of said plurality of standardized shipping containers is an ISO shipping container.

28. An unmanned system as in claim 24 further comprising means, mounted in at least one of said plurality of standardized shipping containers and coupled to said controller and the operational payload associated therewith, for automated manipulation of the operational payload as dictated by instructions provided by said controller.

29. An unmanned system as in claim 24 further comprising means, coupled to said controller and shipping container structure of at least one of said plurality of standardized shipping containers, for automatically opening said shipping container structure as dictated by instructions provided by said controller to permit dispensing of at least a portion of the operational payload associated therewith.

30. An unmanned system as in claim 29 wherein said means is coupled to a side of said shipping container structure and wherein said side can be opened and closed.

31. An unmanned system as in claim 29 wherein said means is coupled to a bottom portion of said shipping container structure and wherein said bottom portion can be opened and closed.

32. An unmanned system as in claim 29 wherein said means is coupled to a top portion of said shipping container structure and wherein said top portion can be opened and closed.

33. An unmanned system as in claim 24 further comprising armor coupled to at least a portion of at least one of said plurality of standardized shipping containers for protection thereof from strikes by projectiles.

34. An unmanned system as in claim 24 further comprising means, mounted in each of said plurality of standardized shipping containers and coupled to said controller associated therewith, for autonomously establishing a global position thereof.

35. An unmanned system as in claim 34 wherein said means for autonomously establishing a global position is selected from the group consisting of a GPS system and an inertial navigation system.

36. An unmanned system as in claim 24 further comprising propulsion means coupled to at least one of said plurality of standardized shipping containers and said controller associated therewith, wherein said at least one can be maneuvered under control of said controller associated therewith.

37. An unmanned system as in claim 24 further comprising means coupled to at least one of said plurality of standardized shipping containers for placing said at least one in a preferred orientation when released into a fluid environment.

38. An unmanned system as in claim 24 further comprising means mounted on the outside of each of said plurality of standardized shipping containers for facilitating connection with an adjacent shipping container.

39. An unmanned system as in claim 24 wherein at least one of said plurality of standardized shipping containers is waterproof.

40. An unmanned system as in claim 24 wherein at least one of said plurality of standardized shipping containers incorporated EMI shielding.

41. An unmanned system as in claim 24 further comprising means coupled to at least one of said plurality of standardized shipping containers for mitigating shock forces experienced thereby.

42. An unmanned system as in claim 24 further comprising means coupled to at least one of said plurality of standardized shipping containers for controlling climatic conditions therein.

* * * * *